(12) United States Patent
Tomioka et al.

(10) Patent No.: US 6,294,049 B1
(45) Date of Patent: Sep. 25, 2001

(54) POLYIMIDE PRECURSOR FIBRID, POLYIMIDE PAPER, POLYIMIDE COMPOSITE PAPER AND POLYIMIDE COMPOSITE BOARD OBTAINED THEREFROM, AND PROCESS FOR PRODUCING THE FIBRID AND THE PAPER PRODUCTS

(75) Inventors: Isao Tomioka; Takeshi Nakano; Mikio Furukawa; Yoshiaki Echigo; Masato Wada, all of Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 08/428,497

(22) Filed: Apr. 27, 1995

Related U.S. Application Data

(63) Continuation of application No. 08/073,463, filed on Jun. 9, 1993, now abandoned.

(30) Foreign Application Priority Data

Jun. 9, 1992 (JP) .................................................. 4-176272

(51) Int. Cl.$^7$ .................................................. D21M 13/26
(52) U.S. Cl. ......................................... 162/146; 162/157.3
(58) Field of Search .............................. 162/146, 157.3; 264/14, 180

(56) References Cited

U.S. PATENT DOCUMENTS

| | | |
|---|---|---|
| 2,999,788 * | 9/1961 | Morgan ................................. 162/146 |
| 3,413,394 | 11/1968 | Jordan . |
| 3,756,908 * | 9/1973 | Gross .................................... 162/146 |
| 4,091,058 * | 5/1978 | Sander et al. ......................... 162/146 |
| 4,098,640 * | 7/1978 | Sander et al. ......................... 162/146 |
| 4,622,384 | 11/1986 | Manwiller . |
| 4,755,555 | 7/1988 | Manwiller et al. . |
| 5,026,456 | 6/1991 | Hesler et al. . |

FOREIGN PATENT DOCUMENTS

| | | |
|---|---|---|
| A 0532953 | 3/1993 | (EP) . |
| A 0532954 | 3/1993 | (EP) . |
| A 2179004 | 11/1973 | (FR) . |
| A 1207485 | 10/1970 | (GB) . |
| A 1218361 | 1/1971 | (GB) . |

* cited by examiner

*Primary Examiner*—Peter Chin
(74) *Attorney, Agent, or Firm*—Sughrue, Mion, Zinn, Macpeak & Seas, PLLC

(57) ABSTRACT

A polyimide precursor fibrid material which comprises a polyimide precursor that forms a polyimide having a property of no thermal melting when subjected to a ring closure reaction and which is substantially free from aprotic polar organic solvents, and polyimide paper, polyimide composite paper and polyimide composite board obtained therefrom. Since the inventive polyimide precursor fibrid material does not contain aprotic polar organic solvents, a polyimide paper product having excellent strength can be obtained from the polyimide precursor fibrid material, and a polyimide composite paper product and a polyimide composite board both consisting of uniformly dispersed components and having excellent strength can be obtained from the polyimide precursor fibrids and other staple fibers.

6 Claims, No Drawings

POLYIMIDE PRECURSOR FIBRID, POLYIMIDE PAPER, POLYIMIDE COMPOSITE PAPER AND POLYIMIDE COMPOSITE BOARD OBTAINED THEREFROM, AND PROCESS FOR PRODUCING THE FIBRID AND THE PAPER PRODUCTS

This is a Continuation of application Ser. No. 08/073,463 filed Jun. 9, 1993 (abandoned).

FIELD OF THE INVENTION

This invention relates to polyimide precursor fibrid materials which do not contain aprotic polar organic solvents, and further to polyimide paper products, polyimide composite paper products and polyimide composite boards obtained from the fibrids and to processes for the production of the fibrids and the paper products.

BACKGROUND OF THE INVENTION

It is known that polyimides have excellent properties in terms of heat resistance, mechanical characteristics, electrical characteristics, weatherability and the like and are useful as materials for films and moldings. For example, a polyimide prepared from 4,4'-diaminodiphenyl ether and pyromellitic acid dianhydride can produce films and moldings having excellent heat stability, and these products are widely used in electrical insulation and the like.

In the field of heat-resistant synthetic paper, on the other hand, aramid synthetic paper is known and is widely used. However, with the improvement in advanced materials for use in spacecraft and aircraft, great interest has recently been directed toward the development of synthetic paper products having excellent heat resistance and strength which are superior to those of aramid paper.

Attempts have been made to obtain polyimide paper by subjecting a polyimide fibrid material to paper making. For example, JP-A-62-297330 discloses a process for the production of a polyimide fibrid material in which a poly(amic acid), which dissolved in an aprotic polar organic solvent, is injected into a coagulation bath containing acetic acid and/or acetic anhydride under high speed agitation. Further, JP-A-64-26718 discloses a process for the production of a polyimide fibrid material in which a poly(amic acid) solution is injected under high shear force into a coagulation bath containing a mixture comprising a chemical cyclization agent and a cyclization catalyst. (The term "JP-A" as used herein means an "unexamined published Japanese patent application".) However, polyimide paper made of the polyimide fibrid material obtained by such processes has a problem in terms of its practical use because of poor strength.

In addition, JP-B-60-1402 discloses a process for the production of pulpy particles in which a polymer solution prepared by solution polymerization in the presence of staple fibers is dispersed in a precipitant. (The term "JP-B" as used herein means an "examined Japanese patent publication".) According to this process, pulpy poly(amic acid) particles containing staple fibers are obtained. However, this process has a problem of causing a reduction in polymerization degree, because an aprotic polar solvent remains inside the pulpy particles, and the poly(amic acid) is apt to be hydrolyzed by the remaining aprotic polar solvent. In addition, the aprotic polar solvent that remains inside the pulpy particles in a large amount causes other problems in that a high purity polyimide paper cannot be obtained when the pulpy particles are subjected to paper making and imidization. In particular, the product becomes a film-like paper with no appearance of pulpy particles when pressurized after paper making because of the remaining aprotic polar solvent which oozes out due to the applied pressure and dissolves the pulpy particles and causes mutual adhesion of the particles.

With the recently increasing demand for materials having improved mechanical properties and heat resistance, complexing of polyimide resins and other materials has been proposed, and processes in which polyimide resin powder and staple fibers are mixed and molded in the same manner as the case of polyimide moldings have been examined. Polyimide moldings are produced by subjecting polyimide resin powder to press molding and heat treatment, as disclosed for example in JP-A-2-18420, JP-B-49-5737, JP-A-61-250030 and JP-A-1-292035. It is difficult, however, to obtain a composite material having high strength because of the difficulty in uniformly mixing and dispersing the resin powder and staple fibers.

SUMMARY OF THE INVENTION

In view of the above, it is an object of the present invention to provide a polyimide precursor fibrid material which does not contain aprotic polar organic solvents, as well as to provide a process for the production of the polyimide precursor fibrid material.

It is a further object of the present invention to provide a polyimide paper product having excellent strength which comprises a polyimide fibrid material resulting from a ring closure reaction of the polyimide precursor that constitutes the above described polyimide precursor fibrid material, as well as to provide a process for the production of the polyimide paper product.

A still further object of the present invention is to provide a polyimide composite paper product having excellent strength which comprises a polyimide fibrid material resulting from a ring closure reaction of the polyimide precursor that constitutes the polyimide precursor fibrid material and other staple fibers wherein these components are uniformly dispersed, as well as to provide a process for the production of the polyimide composite paper product.

Another object of the present invention is to provide a polyimide composite board having excellent strength which comprises a polyimide fibrid material resulting from a ring closure reaction of the polyimide precursor that constitutes the polyimide precursor fibrid material and other staple fibers wherein these components are uniformly dispersed, as well as to provide a process for the production of the polyimide composite board.

Other objects and advantages of the present invention will be made apparent as the description progresses.

DETAILED DESCRIPTION OF THE INVENTION

With the aim of overcoming the aforementioned problems involved in the prior art, the inventors of the present invention have conducted intensive studies and found that a polyimide precursor fibrid material free from aprotic polar organic solvents can be produced when a polyimide precursor solution prepared from a polyimide precursor material and a solvent or a mixture of solvents which do not exhibit a strong solvation with the polyimide precursor is injected into a coagulation bath and treated under a shear force. Further, a polyimide paper, polyimide composite paper and polyimide composite board obtained from paper made of the thus produced polyimide precursor fibrid material are also free from the aforementioned problems. The present invention has been accomplished on the basis of these findings.

Accordingly, the present invention is directed to: a polyimide precursor fibrid material which comprises a polyimide precursor that forms a polyimide having a property of no thermal melting when subjected to a ring closure reaction and which are substantially free from aprotic polar organic solvents, and a process for the production of the polyimide precursor fibrid material; a polyimide paper product which comprises a polyimide fibrid material resulting from a ring closure reaction of the polyimide precursor that constitutes the just described polyimide precursor fibrid material, and a process for the production of the polyimide paper product; a polyimide composite paper product which comprises a polyimide fibrid material resulting from a ring closure reaction of the polyimide precursor that constitutes of the polyimide precursor fibrid material and other staple fibers, and a process for the production of the polyimide composite paper product; and a polyimide composite board which comprises a polyimide fibrid resulting from a ring closure reaction of the polyimide precursor that constitutes the polyimide precursor fibrid material and other staple fibers, and a process for the production of the polyimide composite board.

The following describes each aspect of the present invention in detail.

1. Polyimide precursor fibrid material and its production process

According to the present invention, any type of polyimide precursor may be used, provided that it becomes a polyimide having a property of no thermal melting when subjected to ring closure. The term "a property of no thermal melting" as used herein means that, when the differential scanning calorimetry (cf. Shinhan Kobunshi Jiten published by Asakura Publishing Co., Ltd.) is conducted after ring closure of the polyimide precursor, the peak corresponding to the melting point is not detected. Examples of polyimide precursors preferable for use in the present invention include aromatic polyimide precursors, especially a homopolymer or a copolymer of a poly(amic acid) having a repeating unit represented by the following formula (1).

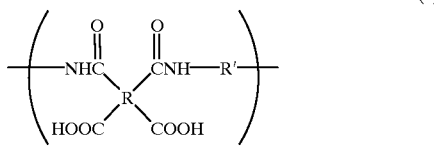

(1)

In the above formula, R is a tetravalent aromatic group having at least one six-membered carbon ring, wherein two pairs of the tetravalent elements each bond to adjacent carbon atoms on a six-membered carbon ring. The following shows illustrative examples of R.

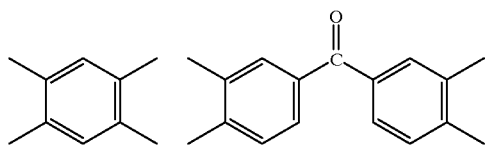

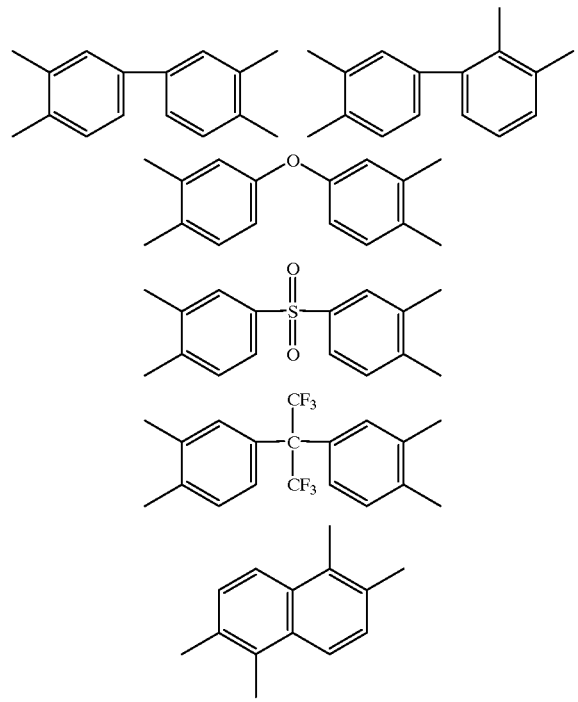

The following shows particularly preferred examples of R.

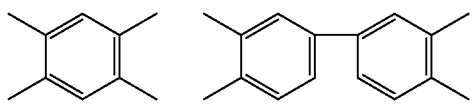

In the above general formula (1), R' represents a divalent aromatic group having 1 to 4 six-membered carbon rings. The following shows illustrative examples of R'.

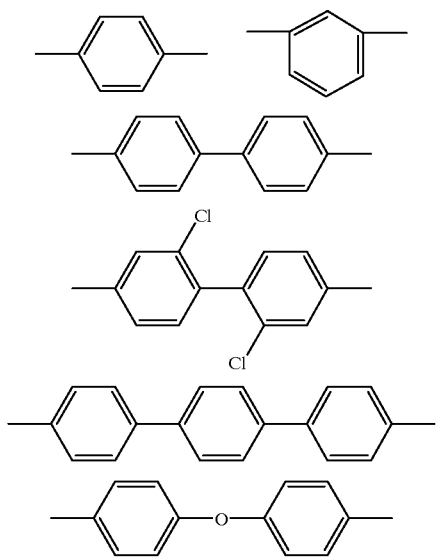

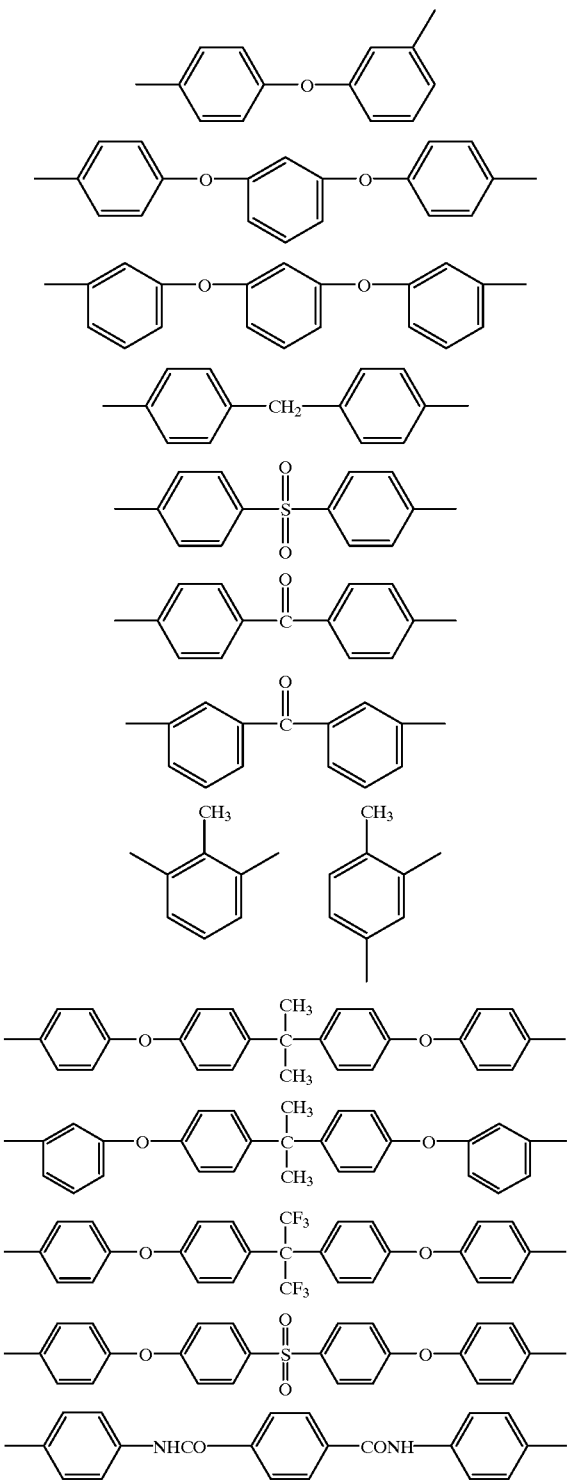

The following is a particularly preferred example of R'.

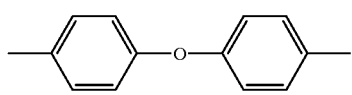

According to the present invention, the polyimide precursor may have an intrinsic viscosity (η) of at least 0.1, preferably 0.5 or more. The intrinsic viscosity (η) is a value directly related to the molecular weight of a polymer and can be measured by a method which will be described later.

The term "aprotic polar organic solvent" as used herein means a solvent which has a large polarity with a solvent-inherent dipole moment of about 3.0 debyes or more, such as N,N-dimethylformamide, N-methyl-2-pyrrolidone, N,N-dimethylacetamide, N-methylcaprolactam, N-acetyl-2-pyrrolidone, dimethyl sulfoxide, hexamethylphosphoramide and the like.

In the prior art process, a polyimide precursor solution is produced by a so-called low temperature solution polymerization method in which a diamine, such as diaminodiphenyl ether or the like, and a tetracarboxylic acid dianhydride, such as pyromellitic dianhydride or the like, are subjected to polymerization in an aprotic polar organic solvent. As a consequence, when a polyimide precursor fibrid material or a polyimide fibrid material is produced by putting a polyimide precursor solution prepared in such a solvent into an aqueous coagulation bath, the aprotic polar organic solvent remains in the resulting fibrids.

In contrast, the polyimide precursor fibrid material of the present invention is produced using a polyimide precursor solution which, as will be described later in detail, comprises a polyimide precursor and a solvent or a mixture of solvents that do not exhibit a strong solvation with the polyimide precursor. Because of this, the resulting polyimide precursor fibrid material is substantially free from aprotic polar organic solvent, and a decrease in the polymerization degree of the polyimide precursor can be prevented. In other words, the polyimide precursor fibrid material according to the present invention has no aprotic polar organic solvent since the aprotic polar organic solvent is not used.

The polyimide precursor solution of the present invention is produced by subjecting a diamine and a tetracarboxylic acid dianhydride to polymerization in a solvent or a mixture of solvents which do not exhibit a strong solvation with the polyimide precursor. The polymerization reaction may be carried out at a temperature of preferably from −30 to 60° C., more preferably from −20 to 40° C., for a period of preferably from 1 to 200 minutes, more preferably from 5 to 100 minutes. As an alternative method, the polyimide precursor solution may be obtained by dissolving a separately prepared polyimide precursor in the just described solvent.

A preferred concentration of a polyimide precursor in the polyimide precursor solution of the present invention may be from 0.1 to 60% by weight, more preferably from 1 to 25% by weight.

Preferred examples of solvents which do not exhibit a strong solvation with the polyimide precursor include mixed solvents selected from the group consisting of water soluble ether compounds, water soluble alcohol compounds, water soluble ketone compounds and water, or a single solvent selected from water soluble compounds having an ether group and an alcoholic hydroxyl group in the same molecule.

Illustrative examples of the water soluble ether compounds include tetrahydrofuran (THF), dioxane, trioxane, 1,2-dimethoxyethane, diethylene glycol dimethyl ether, diethylene glycol diethyl ether and the like, of which THF is particularly preferred.

Illustrative examples of the water soluble alcohol compounds include methanol, ethanol, 1-propanol, 2-propanol, tert-butyl alcohol, ethylene glycol, 1,2-propanediol, 1,3- propanediol, 1,3-butanediol, 1,4-butanediol, 2,3-butanediol, 1,5-pentanediol, 2-butene-1,4-diol, 2-methyl-2,4-pentanediol, glycerol, 2-ethyl-2-(hydroxymethyl)-1,3-propanediol, 1,2,6-hexanetriol and the like, of which methanol, ethanol and ethylene glycol are particularly preferred.

Illustrative examples of the water soluble ketone compounds include acetone, methyl ethyl ketone and the like, of which acetone is particularly preferred.

In the case of a solvent mixture, a preferred combination of solvents is a water soluble ether compound with water, a water soluble ether compound with a water soluble alcohol compound or a water soluble ketone compound with water. A preferred mixing ratio (weight ratio) in the mixed solvent may be from 96:4 to 79:21 in the case of a water soluble ether compound with water. In the case of a water soluble ether compound with a water soluble alcohol compound, it may be from 90:10 to 56:44, and, in the case of a water soluble ketone compound with water, it may be from 90:10 to 65:35.

In the case of a single solvent, a water soluble compound having an ether group and an alcoholic hydroxyl group in the same molecule is used. Illustrative examples of such compounds include 2-methoxyethanol, 2-ethoxyethanol, 2-(methoxymethoxy) ethoxyethanol, 2-isopropxyethanol, 2-butoxyethanol, tetrahydrofurfuryl alcohol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polyethylene glycol, polypropylene glycol and the like, of which 2-methoxyethanol and tetrahydrofurfuryl alcohol are particularly preferred. Such a water soluble compound having an ether group and an alcoholic hydroxyl group in the same molecule may also be used in combination with a poor solvent.

The term "solvation" as used herein means the association of a solute and a solvent, or a substantial interaction between the solvent and a polyimide precursor as the solute in a polyimide precursor solution. The degree of solvation can be determined for example on the basis of a solvation index measured by the following procedure. That is, a 5,000 mg portion of a solution containing 6% by weight of a polyimide precursor is poured uniformly in a usual glass dish having an inside diameter of 86 mm and a height of 18 mm and air-dried at room temperature to a state of no fluidity. Thereafter, the solvent is removed by distillation at 40° C. for 40 hours under a reduced pressure of 10 mmHg to measure weight of the polyimide precursor remained in the dish. The salvation index is then calculated using the following formula:

$$\frac{A - 300}{300}$$

where A is weight (mg) of the dried polyimide precursor.

According to the present invention, the solvent to be used may preferably have a salvation index of less than 0.35, preferably 0.3 or below, and a solvent-inherent dipole moment of 3 debyes or less.

The polyimide precursor fibrid material of the present invention may be obtained by injecting the aforementioned polyimide precursor solution into a coagulation bath under a shear force and subsequently recovering the formed precipitate. For this purpose, a mixer, a Waring blender or a rotor/stator agitation system may be employed.

With regard to the coagulation bath, any solvent may be used provided that it is a poor solvent for the polyimide precursor. In general, however, water which is a typical poor solvent for the polyimide precursor or a mixed solvent containing water in an amount of 70% by weight or more is used. Any water soluble solvent may be used in such a type of mixed solvent, but preferably a water soluble ether, a water soluble alcohol, a water soluble ketone or the like is used. Preferably, the volume ratio of the coagulation bath to the polyimide precursor solution may be from 5 to 100. Fibrid formation may preferably be effected at a temperature of from 10 to 60° C. and for a shearing period of from 5 seconds to 10 minutes.

According to the present invention, the term "polyimide precursor fibrid" means fibrous or filmy granules, and two of the three dimensions of each granule are microns in size.

2. Polyimide paper and its production process

The polyimide paper of the present invention is produced by firstly making paper from a polyimide precursor fibrid material which is substantially free from any aprotic polar organic solvent and then subjecting the polyimide precursor that constitutes the thus prepared paper to ring closure. Because of this, the polyimide paper is substantially free from any aprotic polar organic solvent.

That is, the polyimide precursor fibrid material obtained as described in the foregoing is uniformly dispersed in an aqueous medium such as water by agitation or the like means, and the resulting suspension is subjected to paper making using a Fourdriner or cylinder paper machine in the same manner as the case of the conventional natural pulp paper making as disclosed, for example, in U.S. Pat. No. 5,026,456. The thus obtained paper material is subjected to compression dehydration under a pressure of from 1 to 200 kg/cm$^2$ until its water content becomes 50 to 90% by weight, thereby obtaining wet paper which comprises the polyimide precursor fibrid material. Thereafter, the polyimide precursor that constitutes the thus prepared polyimide precursor wet paper is subjected to chemical or thermal ring closure to obtain the polyimide paper of interest.

Chemical ring closure may be effected by soaking the wet paper in a usually used ring closure catalyst solution such as a solution of acetic anhydride and pyridine, acetic anhydride and picoline, or acetic anhydride and 2,6-lutidine, for 1 to 20 hours at room temperature. While thermal ring closure is carried out, the wet paper may be heated at a temperature of from 150 to 300° C. for a period of from 0.5 to 5 hours. In such a case, it is desirable to dry the wet paper thoroughly prior to the thermal ring closure.

Since ring closure is carried out after the paper making step, entanglements of fibrids are strengthened during the ring closure step, and the thus produced polyimide paper therefore shows excellent strength.

The resulting polyimide has a repeating unit represented by the following formula (1):

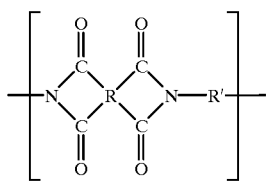

(1)

wherein R is a tetravalent aromatic group having at least one six-membered carbon ring, wherein two pairs of the tetravalent elements each bond to adjacent carbon atoms on a six-membered carbon ring, and R' represents a divalent aromatic group having 1 to 4 six-membered carbon rings.

3. Polyimide composite paper and its production process

The polyimide composite paper of the present invention is obtained by dispersing the polyimide precursor fibrid material, obtained in the same manner as described in the foregoing, and staple fibers in an aqueous medium, subjecting the thus prepared mixed suspension to paper making and compression dehydration in the same manner as described above and then subjecting the polyimide precursor that constitutes the polyimide precursor fibrids in the resulting wet paper to ring closure. In other words, the polyimide composite paper is obtained in the same manner as the above polyimide paper production process, except that staple fibers are blended at the time of paper making by dispersing them in an aqueous medium together with the polyimide precursor fibrids. Because of this, the resulting polyimide composite paper has excellent uniformity.

Staple fibers having good dispersibility in aqueous media, such as glass fibers, carbon fibers, organic fibers, ceramic fibers and the like, are used for the production of the composite paper of the present invention. Of these, para-aramid staple fibers produced from paraphenylenediamine and terephthalic acid chloride, meta-aramid staple fibers produced from metaphenylenediamine and isophthalic acid chloride or copolymer aramid staple fibers prepared therefrom are particularly preferred.

Preferably, each staple fiber may have a length of 1 to 20 mm and a diameter of 5 to 20 µm. The polyimide precursor fibrid material and staple fibers may be blended in such amounts that the weight ratio of the imidized polyimide fibrids to the staple fibers is from 5:95 to 99.5:0.5.

4. Polyimide composite board and its production process

A polyimide precursor fibrid material and staple fibers are subjected to paper making and subsequent compression dehydration in the same manner as the case of the polyimide composite paper production, optional numbers of the resulting wet composite paper sheets or dried sheets thereof are superposed upon one another and pressed to make the layers into mutually integrated form and then the polyimide precursor that constitutes the thus integrated layers are subjected to ring closure. In this way, the polyimide composite board of the present invention is obtained which comprises polyimide fibrids having a property of no thermal melting and staple fibers and are substantially free from any aprotic polar organic solvent. In this instance, density of the composite board can be controlled by adjusting the pressing pressure which may be preferably from 1 to 5,000 kg/cm².

When dried layers of the paper are laminated, it is desirable to heat them during pressing in order to improve inter-layer adhesive property, which may be effected at a pressing surface temperature of from 80 to 300° C.

The thus laminated and pressed board may be made into the polyimide composite board of the present invention either by carrying out ring closure of the polyimide precursor in the same manner as the composite paper production described herein or by effecting thermal ring closure of a part or whole of the polyimide precursor at the time of the laminate-pressing.

Since the paper layers in which the polyimide precursor fibrids and staple fibers are uniformly dispersed are laminated, the resulting polyimide composite board shows excellent uniformity.

The resulting polyimide has a repeating unit represented by the following formula (1):

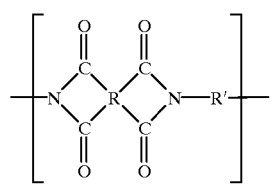

(1)

wherein R is a tetravalent aromatic group having at least one six-membered carbon ring, wherein two pairs of the tetravalent elements each bond to adjacent carbon atoms on a six-membered carbon ring, and R' represents a divalent aromatic group having 1 to 4 six-membered carbon rings.

The following examples are provided to further illustrate the present invention. It is to be understood, however, that the examples are for the purpose of illustration only and are not intended to limit the scope of the present invention in any way.

Characteristic values evaluated in the examples are determined as follows.

Breaking length:

Calculated based on the following formula in accordance with JIS P8113.

$$\text{Breaking length (km)} = \frac{\text{tensile strength (kg)}}{\text{width}^{*1} \times \text{weight}^{*2}} \times 1000$$

[*¹, Test Piece Width (mm); *², Basis Weight (g/m²)]

Intrinsic viscosity (η):

Calculated using the following formula after measuring a flow time of a polymer solution (0.5% by weight of a polyimide precursor in N,N-dimethylacetamide) and of its solvent alone (N,N-dimethylacetamide) at 30° C. through a constant volume capillary tube of a standard viscometer. In the formula, c is the concentration of a polyimide precursor tested.

$$\text{Intrinsic Viscosity} = \frac{\ln\frac{\text{viscosity or flow time of solution}}{\text{viscosity or flow time of solvent}}}{c \text{ (concentration)}}$$

Water retentivity:

Measured in accordance with JAPAN TAPPI Paper and Pulp Testing Method No. 26–78.

Tensile strength:

Measured in accordance with JIS K6911.

Bending strength:

Measured in accordance with JIS K6911.

Young's modulus in flexure:

Measured in accordance with JIS K6911.

EXAMPLE 1

A 2.00 g portion of diaminodiphenyl ether was dissolved in 33.5 g of THF solution containing 4.5% by weight of water, and the resulting solution was kept at 30° C. A 2.19 g portion of pyromellitic dianhydride was added to the solution at once, and the mixture was stirred for 1 hour to obtain a solution of a poly(amic acid) having an intrinsic viscosity ($\eta$) value of 2.5. Solvation index in this solution system was found to be 0.28. This solution was diluted with 11.1 g of water and 230.6 g of THF (solid contents, 1.5% by weight). A household mixer was charged with 1.2 liters of water and stirred vigorously to which was gradually added 80 g of the diluted poly(amic acid) solution for 2 minutes, followed by an additional 1 minute of stirring to obtain a poly(amic acid) fibrid material. The thus formed poly(amic acid) fibrid material was collected by filtration, suspended in 1 liter of water and stirred again. When the stirring and filtration steps were repeated three times, the resulting poly(amic acid) fibrid material showed a ($\eta$) value of 2.0 and a water retentivity of 240. Since aprotic polar organic solvents are not used in this example unlike the case of the prior art process, it is evident that the thus obtained poly (amic acid) fibrid material is substantially free from any aprotic polar organic solvent.

EXAMPLE 2

A 4.00 g portion of diaminodiphenyl ether was dissolved in a mixture solution consisting of 59.6 g of THF and 15.9 g of methanol, and the resulting solution was kept at 3.8° C. A 4.40 g portion of pyromellitic dianhydride was added to the solution at once, and the mixture was stirred for 1 hour to obtain a solution of a poly(amic acid) having a ($\eta$) value of 1.0. Solvation index in this solution system was found to be 0.30. This solution was diluted with a THF/methanol solvent system (weight ratio, 4/1) to reduce the solid contents to 7.5%. The rotational viscosity was 74 cps. A continuous homomixer (capacity, 500 ml; turbine revolution, 8,500 rpm) equipped with inlets for coagulant and feed liquid and an outlet for fibrid slurry after coagulation was simultaneously charged with the diluted poly (amic acid) solution (24 ml/min) and water (960 ml/min), and the resulting fibrid slurry was continuously discharged from the outlet. The thus formed poly(amic acid) fibrid material was collected by filtration, suspended in 1 liter of water and stirred again. When the stirring and filtration steps were repeated three times, the resulting poly(amic acid) fibrid material showed a ($\eta$) value of 0.8 and a water retentivity of 460. Since aprotic polar organic solvents are not used in this example unlike the case of the prior art process, it is evident that the thus obtained poly(amic acid) fibrid material is substantially free from any aprotic polar organic solvent.

EXAMPLE 3

A 1.2 g portion of the fibrid material obtained in Example 1 was dispersed in 2 liters of water and made into a sheet of paper having a size of 10 cm×10 cm. The thus prepared paper was subjected to compression dehydration under a pressure of 10 kg/cm$^2$ and then to imidization by soaking the dehydrated paper in an acetic anhydride/pyridine mixture solvent system (volume ratio, 7/3) for 20 hours at room temperature. The thus imidized paper was washed with toluene and then dried at 80° C. for 1 hour to obtain a sheet of po-lyimide paper having a breaking length of 1.6 km.

EXAMPLE 4

A sheet of paper was prepared in the same manner as described in Example 3, and the poly(amic acid) wet paper after compression dehydration was subjected to imidization by heating it at 200° C. for 10 minutes and then at 300° C. for 1 hour. The thus obtained polyimide paper showed a breaking length of 1.8 km.

EXAMPLE 5

A 3 g portion of the fibrid material obtained in Example 2 was dispersed in 1.5 liters of water and made into a sheet of paper having a size of 15 cm×15 cm. The thus prepared paper was subjected to compression dehydration under a pressure of 10 kg/cm$^2$ and then soaked in an acetic anhydride/pyridine mixture solvent system (volume ratio, 7/3) for 20 hours at room temperature. The thus treated paper was washed with toluene, dried at 80° C. for 1 hour under a reduced pressure and then subjected to thermal press at 100° C. for 5 minutes under a pressure of 10 kg/cm$^2$ to obtain a sheet of polyimide paper having a breaking length of 3.0 km.

EXAMPLE 6

A sheet of poly(amic acid) wet paper obtained in the same manner as described in Example 5 was subjected to compression dehydration and then dried at 60° C. for 1 hour. The paper shrank by a factor of 15% by the drying. The resulting poly(amic acid) dry paper was fixed on a stainless steel frame and imidized by heating it at 150° C. for 1 hour and then at 300° C. for 1 hour. The thus obtained polyimide paper showed a breaking length of 4.9 km.

COMPARATIVE EXAMPLE 1

A 6.01 g portion of diaminodiphenyl ether was dissolved in 112 g of N-methyl-2-pyrrolidone (NMP), and the resulting solution was kept at 30° C. A 6.54 g portion of pyromellitic dianhydride was added to the solution at once, and the mixture was stirred for 1 hour to obtain a solution of a poly(amic acid) having a ($\eta$) value of 2.3. Solvation index in this solution system was found to be 0.66. This solution was diluted with 306 g of N-methyl-2-pyrrolidone (solid contents, 3%). A household mixer was charged with 500 ml of water and stirred vigorously to which was added 70 g of the diluted poly(amic acid) solution. One minute thereafter, the thus formed poly(amic acid) fibrid material was collected by filtration, suspended in 1 liter of water and stirred again. When the stirring and filtration steps were repeated three times, the resulting poly(amic acid) fibrid material showed a ($\eta$) value of 0.5 and a water retentivity of 440.

A 1.2 g portion of the fibrid material was dispersed in 1 liter of water and made into a sheet of paper having a size of 10 cm in diameter. The thus prepared paper was subjected to compression dehydration under a pressure of 10 kg/cm$^2$ to find formation of a semi-transparent film-like material having the odor of NMP. When this material was dried at 60° C. for 1 hour, it shrank by a factor of 30% and became considerably brittle.

EXAMPLE 7

A 0.7 g portion of a poly(amic acid) fibrid material obtained in the same manner as described in Example 2 and 0.7 g of para-aramid staple fibers (1.5 d, 6 mm) were dispersed in 2 liters of water and made into a sheet of paper having a size of 15 cm×15 cm. The thus prepared paper was subjected to compression dehydration under a pressure of 10 kg/cm$^2$, dried at 60° C. and then subjected to imidization by heating the dried paper at 150° C. for 1 hour and then at 300° C. for 1 hour. In this way, a sheet of composite paper having a thickness of 213 $\mu$m and a density of 0.32 g/cm$^3$ was obtained. It showed an elongation percentage of 2% and a breaking length of 3.9 km.

EXAMPLE 8

A 0.6 g portion of a poly(amic acid) fibrid material obtained in the same manner as described in Example 2 and 0.6 g of meta-aramid staple fibers (1.5 d, 5 mm) were subjected to paper making and imidization in the same manner as described in Example 7. In this way, a sheet of composite paper having a thickness of 134 μm and a density of 0.42 g/cm³ was obtained. It showed an elongation percentage of 6% and a breaking length of 4.2 km.

EXAMPLE 9

A 1.0 g portion of a poly(amic acid) fibrid material obtained in the same manner as described in Example 2 and 1.0 g of para-aramid staple fibers (1.5 d, 6 mm) were subjected to paper making in the same manner as described in Example 7, and the resulting paper was subjected to compression dehydration under a pressure of 150 kg/cm² and then dried at 60° C. Thereafter, the dried paper was subjected to 10 minutes of thermal press at 170° C. under a pressure of 10 kg/cm², followed by 1 hour of heating at 300° C. to effect imidization. In this way, a sheet of composite paper having a thickness of 162 μm and a density of 0.59 g/cm³ was obtained. It showed an elongation percentage of 3% and a breaking length of 5.9 km.

EXAMPLE 10

A 3.0 g portion of a poly(amic acid) fibrid material obtained in the same manner as described in Example 2 and 3.0 g of para-aramid staple fibers (1.5 d, 6 mm) were dispersed in 3 liters of water and made into sheets of paper having a size of 15 cm×15 cm. The thus prepared paper sheets were subjected to compression dehydration under a pressure of 2 kg/cm², and 4 sheets of the resulting wet paper were superposed upon one another and again subjected to compression dehydration under a pressure of 150 kg/cm². After drying at 60° C., the resulting laminate was subjected to 10 minutes of thermal press at 170° C. under a pressure of 100 kg/cm² and then to 1 hour of thermal imidization at 300° C. In this way, a composite board having a thickness of 1.38 mm and a density of 0.74 g/cm³ (porosity, 49%) was obtained. It showed an elongation percentage of 6% and a tensile strength of 5.7 kg/mm².

EXAMPLE 11

A 3.0 g portion of a poly(amic acid) fibrid material obtained in the same manner as described in Example 2 and 3.0 g of para-aramid staple fibers (1.5 d, 6 mm) were dispersed in 3 liters of water and made into sheets of paper having a size of 15 cm×15 cm. The thus prepared paper sheets were subjected to compression dehydration under a pressure of 10 kg/cm² and then dried at 60° C. Thereafter, 14 sheets of the resulting dry paper were superposed upon one another and subjected to thermal press under a pressure of 500 kg/cm² firstly at 170° C. for 10 minutes and then at 250° C. for 10 minutes, followed by 1 hour of heat treatment at 300° C. In this way, a composite board having a thickness of 2.54 mm and a density of 1.35 g/cm³ (porosity, 6%) was obtained. It showed a bending strength of 1,200 kg/cm² and a Young's modulus in flexure of 59,000 kg/cm².

Thus, because of the specific construction of the present invention, the inventive polyimide precursor fibrid material does not contain aprotic polar organic solvents. As a result, a polyimide paper product having excellent strength can be obtained from the polyimide precursor fibrid material, and a polyimide composite paper product and a polyimide composite board both consisting of uniformly dispersed components and having excellent strength can be obtained from the polyimide precursor fibrids and other staple fibers. The polyimide paper, polyimide composite paper and polyimide composite board obtained from the aprotic polar organic solvent-free polyimide precursor fibrids are also free from the aprotic polar organic solvent. In addition, according to the respective processes of the present invention, the polyimide precursor fibrid material, polyimide paper, polyimide composite paper and polyimide composite board can be produced easily.

Although some preferred embodiments have been described, many modifications and variations may be made thereto. It is to be understood therefore that the invention may be practiced otherwise than as specifically described.

What is claimed is:

1. A process for producing a polyimide paper product, which comprises:

paper-making a poly(amic acid) paper from a poly(amic acid) fibrid, and imidizing the resulting poly(amic acid) paper, said polyimide having a repeating unit represented by the following formula (1):

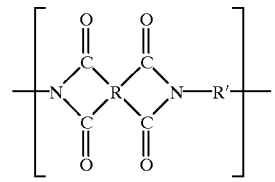

(1)

wherein R is tetravalent aromatic group having at least one six-membered carbon ring, wherein two pairs of the tetravalent elements each bond to adjacent carbon atoms on a six-membered carbon ring, and R' represents a divalent aromatic group having 1 to 4 six-membered carbon rings, and said poly(amic acid) having a repeating unit represented by the following formula (2):

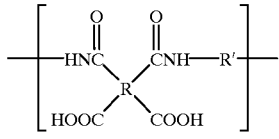

(2)

wherein R is a tetravalent aromatic group having at least one six-membered carbon ring, wherein two pairs of the tetravalent elements each bond to adjacent carbon atoms on a six-membered carbon ring, and R' represent a divalent aromatic group having 1 to 4 six-membered carbon rings.

2. The process for producing a polyimide paper product according to claim 1, wherein said polyimide paper product has a breaking length of 1.5 to 5.0 km.

3. The process for producing a polyimide paper product according to claim 2, wherein said imidization is thermal imidization.

4. A process for producing a polyimide composite paper product, which comprises:

paper-making a poly(amic acid) composite paper from a poly(amic acid) fibrid and a staple fiber, and imidizing the resulting poly(amic acid) composite paper, said polyimide having a repeating unit represented by the following formula (1):

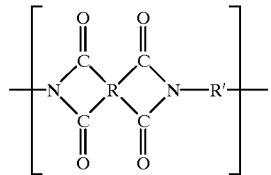

(1)

wherein R is a tetravalent aromatic group having at least one six-membered carbon ring, wherein two pairs of the tetravalent elements each bond to adjacent carbon atoms on a six-membered carbon ring, and R' represents a divalent aromatic group having 1 to 4 six-membered carbon rings, and said poly(amic acid) having a repeating unit represented by the following formula (2):

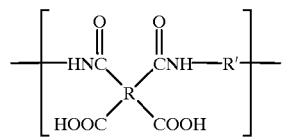

(2)

wherein R is a tetravalent aromatic group having at least one six-membered carbon ring, wherein two pairs of the tetravalent elements each bond to adjacent carbon atoms on a six-membered carbon ring, and R' represent a divalent aromatic group having 1 to 4 six-membered carbon ring, and the weight ratio of the imidized polyimide fibrid to the staple fiber being from 5:99 to 99.5:0.5.

5. The process for producing a polyimide composite paper product according to claim 4, wherein said polyimide composite paper product has a breaking length of from 3.5 to 6.0 km.

6. The process for producing a polyimide composite paper product according to claim 4, wherein said staple fiber is an aramide staple fiber.

* * * * *